United States Patent [19]

Velinsky et al.

[11] 4,138,338

[45] Feb. 6, 1979

[54] FILTER FOR THICKENING SUSPENSIONS OF FIBROUS MATERIAL

[75] Inventors: Johannes Velinsky; Theodor Bahr, both of Heidenheim, Fed. Rep. of Germany

[73] Assignee: J. M. Voith GmbH, Heidenheim, Fed. Rep. of Germany

[21] Appl. No.: 804,507

[22] Filed: Jun. 8, 1977

[30] Foreign Application Priority Data

Jun. 12, 1976 [DE] Fed. Rep. of Germany ........ 2626458

[51] Int. Cl.² ............................................. B01D 33/02
[52] U.S. Cl. ..................... 210/327; 210/331; 210/334; 210/347
[58] Field of Search ........... 210/327, 330, 331, 338 R, 210/334, 346, 347, 388

[56] References Cited

U.S. PATENT DOCUMENTS

| 1,283,925 | 11/1918 | Salisbury | 210/331 X |
|---|---|---|---|
| 1,446,448 | 2/1923 | Brown | 210/331 X |
| 2,593,707 | 4/1952 | Walker | 210/331 X |
| 2,932,402 | 4/1960 | Logue et al. | 210/347 X |
| 3,061,477 | 10/1962 | Lavallee | 210/347 X |
| 3,096,278 | 7/1963 | Francom | 210/331 X |
| 3,157,598 | 11/1964 | Rebiscoul | 210/331 X |
| 3,193,105 | 7/1965 | Putnam | 210/331 |
| 3,317,050 | 5/1967 | Daman | 210/331 |
| 3,471,026 | 10/1969 | Riker | 210/331 X |

*Primary Examiner*—Robert H. Spitzer
*Attorney, Agent, or Firm*—Lon H. Romanski

[57] ABSTRACT

A filter arrangement for thickening suspensions of fibrous material is shown as having rotating filter elements encased in a filter trough with such filter elements being pairs of filter disks fixed at right angles to a rotary hollow shaft and further defining a chamber as between such filter disks; the chambers are connected through the hollow shaft to a suction head to which down-pipes are linked and in which material outlet shafts are disposed between the pairs of filter disks; turbulence generating means are provided in the filter trough and the filter disks are provided with at least one ejector vane.

18 Claims, 4 Drawing Figures

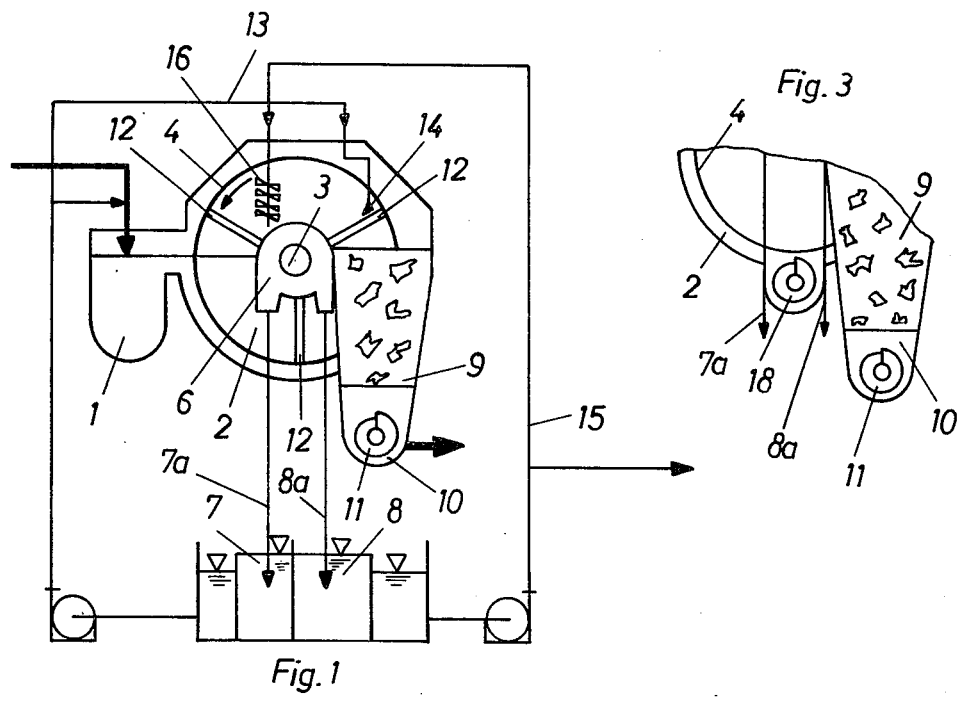
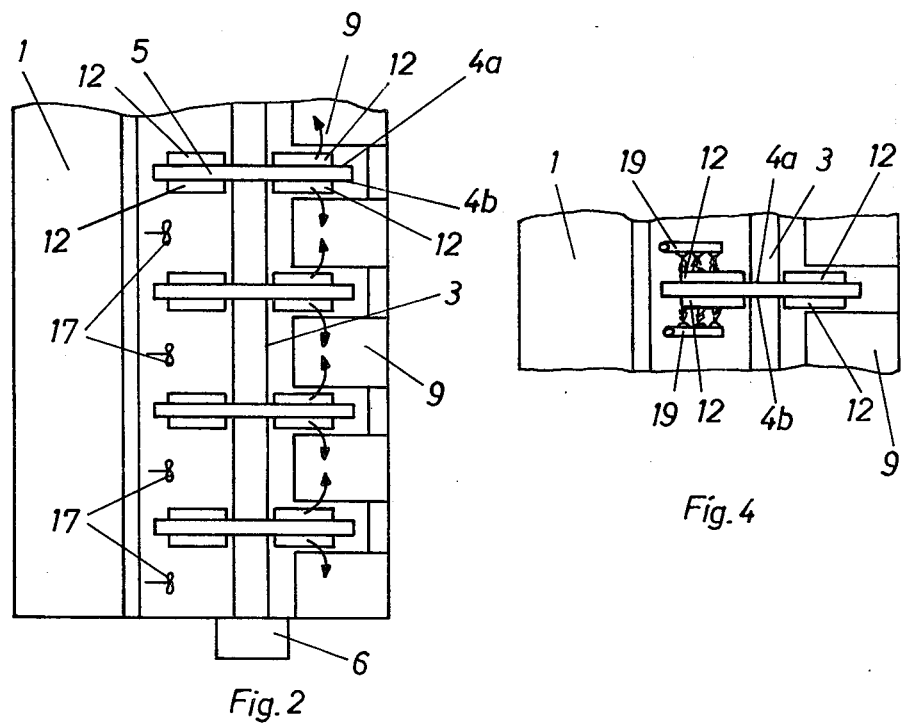

FILTER FOR THICKENING SUSPENSIONS OF FIBROUS MATERIAL

BACKGROUND OF THE INVENTION

This invention relates generally to a filter, for thickening suspensions of fibrous material, with rotary filter elements encased in a filter trough in which filter the said filter elements comprise pairs of filter disks fixed to a rotating hollow shaft and the chamber formed inside a pair of such filter disks is connected to the hollow shaft and wherein the hollow shaft is connected to a suction head, to which downpipes are connected, with material outlet shafts being disposed between the pairs of filter disks.

Filters of this kind are normally used in the paper industry as so-called disk filters for recovering fibrous material. To this end a plurality of pairs of filter disks are disposed next to one another on the hollow shaft in a filter trough. Because of the high pressure difference caused by the downpipes between the fibrous suspension in the trough and the inner chamber formed by the pairs of filter disks, a thick fleecy coating of fibrous material exhibiting about 10 to 12% atro forms very rapidly on the individual disks.

With disk filters the process for recovering the fibrous materials occurs in the following manner: After immersion of the filtering faces, the fibers settle on the surface of the filters while the so-called turbid water, water mixed with fibers, still passes through the filtering face (first water extraction zone). But a tight fleece of fibers forms very rapidly, this serving as an auxiliary filtering layer and only allowing clear water to pass through the filter now (second water extraction zone). Here the fiber thickening only takes place on the surfaces of the filters.

This fiber layer is then sprayed from the disk faces into the material outlet shafts with water, preferably turbid filtrate, from the first water extraction zone. In addition a clear water of very high quality is obtained in the second water extraction zone.

So-called drum thickeners are known in the paper industry for simple thickening work. In these thickeners the drum shell acts as a filtering face. But no particularly thick fibrous coating forms on the drum shell. Rather the suspension is thickened in the trough itself. The pressure drop is generally constituted by the difference in level between the fluid inside the drum and the suspension in the trough. With this, concentration values of 4 to 7% atro are reached.

To improve the thickening action with drum thickeners it is already known (as disclosed by German Pat. No. 1,254,594) to employ stirring devices incorporated in the drum so that the suspension is swirled around and the solid particles are carried to the wall of the filter drum. In spite of the small filtering area as compared with disk filters, drum thickeners generally have a thickening performance of about 2 to 2.5 tonnes/day/m$^2$ of filtering area. But in the case of disk filters the thickening performance is only about 0.5 to 0.7 tonnes/day/m$^2$ of filtering area. The advantage of a larger filtering area is partially eliminated again in the case of disk filters by the lower output of the disk filter. This is because the rapid fleece formation on the surfaces of the filter only allows minimal further water extraction. For this reason disk filters have largely been used for fiber recovery, up to now, since the throughput was of lesser importance than optimum fiber recovery.

Consequently, the general object underlying the present invention is to raise the throughput levels in disk filters so that disk filters can be used rationally not only for fiber recovery but also for thickening suspensions of fibrous material.

SUMMARY OF THE INVENTION

The foregoing general objective is achieved in accordance with the invention in that devices are provided in the trough to generate turbulence and in that each of the filter disks is fitted with at least one ejector vane.

Surprisingly, it has been discovered that with disk filters the generation of turbulence produces exactly the opposite effect to that with drum thickeners. In fact this turbulence prevents tight fleece formation on the filtering faces. Fleeces in the process of formation become detached and more filtrate can flow through the filter. Moreover, as a result the thickening no longer takes place primarily on the filtering faces of the filter disks but the suspension is thickened directly in the filter trough. Admittedly this did not yield any very high material density but it is adequate for the disk filter to be used as a thickener. Because more filtrate passes through the filter disks, the throughput level is considerably higher. The ejector vanes on the filter disks convey the thickened suspension from the filter trough into the material outlet shafts. The arrangements in accordance with the invention have the result that the main advantage of disk filters as compared to drum thickeners, namely a very large filtering area, is preserved in a small space while, however, its throughput level approaches that of a drum thickener.

A further advantage of the invention lies in the two possible uses. If the disk filter is to be used for fiber recovery in which a high fiber yield is important instead of for thickening fiber suspensions when a high throughput with a moderate thickening effect is required, the arrangements for generating turbulence only need to be omitted.

One advantageous extension of the invention consists in the arrangements for generating turbulence exhibiting one or more propellers disposed in the trough.

Another possible embodiment of the invention consists in the arrangements for generating turbulence exhibiting a rotating worm extending over the length of the drum.

One preferred embodiment of the invention consists in the arrangements for generating turbulence exhibiting spray nozzles aimed at the filtering faces of the filter disks. A very high throughput is attained with this arrangement. The fleece already formed is broken off again by the water sprayed on it, drops back into the filter trough and a new fleece can form for further thickening. If necessary a plurality of spray nozzles can be disposed one behind another in the direction of rotation. Either the turbid water obtained during thickening or the suspension to be thickened itself can be used to spray on the filtering faces.

Provision is also made in accordance with the invention for the ejector vanes fitted on the rotating filter disks to be so wide that they fill the space between the pairs of filter disks and the material outlet shafts in each case.

As a result the suspension highly concentrated in the area of the material outlet shafts is picked up almost completely and can be "shoveled" into the material shafts by the ejector vanes.

In accordance with the invention the ejector vanes simply run across the filter disks in a generally radial direction. However in the same way scoop-shaped ejectors are also possible.

In the following, embodiment examples of the invention are illustrated showing further features in accordance with the invention.

Various general and specific objects and advantages of the invention will become apparent when reference is made to the following detailed description considered in conjunction with the accompanying drawings.

BRIEF DESCRIPTION OF THE DRAWINGS

FIG. 1 is a diagrammatic illustration of the disk filter viewed from the side;

FIG. 2 is a view from above the disk filter of FIG. 1;

FIG. 3 is a fragmentary side view of a disk filter with a worm for generating the turbulence; and FIG. 4 is a fragmentary top view of a disk filter with spray nozzles for generating the turbulence.

DETAILED DESCRIPTION OF THE PREFERRED EMBODIMENT

The fibrous suspension to be thickened is conveyed through an inlet tank 1 into a filter trough 2 in which a plurality of pairs of filter disks 4 are disposed on a hollow shaft 3. Each pair of filter disks 4 consists of two filter disks 4a and 4b and the chamber 5 formed between them communicates with the hollow shaft 3. The water extracted from the fibrous suspension passes through the filtering faces into the hollow shaft 3 and is conveyed along its axis to the suction head 6. In the suction head 6 a dividing wall ensures in a manner known per se that the water is passed along suitable lines 7a and 8a into a so-called turbid filtrate tank 7 and a clear filtrate tank 8, respectively, as appropriate. In the first water extraction zone turbid water is produced in the known manner and it is only in the second water extraction zone that clear water is produced. The required high vacuum is achieved through the downpipes 7a and 8a. Between any two pairs of filter disks 4, other than the end disks, there is a material outlet shaft 9. The material outlet shafts or chutes 9 have a common bottom section 10 in which a screw conveyer 11 is located through which the thickened material is carried out. In each case the filter disks 4a and 4b are provided with three radial ejector vanes 12. The breadth of the ejector vanes 12 is chosen so that they almost fill the space between the pairs of filter disks 4 and the material outlet shafts or chutes 9. As the pairs of filter disks 4 rotate, they shovel the thickened suspension into the material outlet shafts 9. From the turbid filtrate tank 7 a line 13 runs to the releasing spray nozzles 14. The material still adhering to the filter disks 4a and 4b is washed off by the releasing spray nozzles 14 and thus conveyed into the material outlet shafts 9 as well. The clear filtrate tank 8 is connected to cleaning nozzles 16 via a line 15. The filter disks 4 are washed clean by the cleaning nozzles 16 before further use.

A plurality of propellers 17 are arranged to generate turbulence in the filter trough 2.

In the section of the bottom part of the disk filter shown in FIG. 3 a rotary worm 18 is illustrated which extends over the full length of the filter trough 2 for generating the turbulence.

Spray nozzles 19 are shown in FIG. 4 for generating turbulence. These spray nozzles 19 spray a part of the suspension to be thickened against the filtering faces and thus impede the formation of a tight fleece or detach a fleece that has already formed.

The various turbulence generators, propellers 17, worm 18 and spray nozzles 19 can be used both alone and next to one another in a disk filter. In the same way other devices that generate the necessary turbulence are also possible within the scope of the invention.

We claim:

1. A filter for thickening suspensions of fibrous material, comprising a rotary shaft having axially extending passage means formed therein, a filter trough, rotating filter elements generally encased within said filter trough, each of said filter elements comprising a pair of filter disks generally juxtaposed to each other and defining a chamber therebetween, said filter disks being fixed to said shaft at generally right angles thereto for rotation therewith, each of said chambers being connected for communication with said passage means in said shaft, a suction head, said passage means in said shaft being connected to said suction head as to thereby complete communication between said suction head and said chambers, material outlet shaft means disposed generally between pairs of said filter disks, turbulence generating means for generating a turbulence in the material carried within said filter trough, and at least one ejector vane means operatively connected to each pair of said filter disks for rotation therewith and for mechanically removing thickened suspension material from said filter trough and depositing such removed thickened suspension material into said material outlet shaft means.

2. A filter according to claim 1 wherein said turbulence generating means comprises at least one propeller means disposed within said filter trough.

3. A filter according to claim 2 wherein each of said ejector vane means is of an effective width as to almost span the space existing between one of said filter disks and an adjoining said material outlet shaft means.

4. A filter according to claim 1 wherein said turbulence generating means comprises rotary worm means disposed within said filter trough.

5. A filter according to claim 4 wherein each of said ejector vane means is of an effective width as to almost span the space existing between one of said filter disks and an adjoining said material outlet shaft means.

6. A filter according to claim 1 wherein said turbulence generating means comprises spray nozzle means effective to cause a spray to be directed against filtering faces comprising said filter disks.

7. A filter according to claim 6 wherein each of said ejector vane means is of an effective width as to almost span the space existing between one of said filter disks and an adjoining said material outlet shaft means.

8. A filter according to claim 1 wherein each of said ejector vane means is of an effective width as to almost span the space existing between one of said filter disks and an adjoining said material outlet shaft means.

9. A filter according to claim 8 wherein said ejector vane means is so positioned as to be extending generally radially of an associated filter disk.

10. A filter according to claim 1 wherein said at least one ejector vane means comprises a first plurality of ejector vanes and a second plurality of ejector vanes, wherein said first plurality of ejector vanes is operatively connected to one of said pair of filter disks in a manner as to have said first plurality of ejector vanes angularly spaced thereabout, and wherein said second plurality of ejector vanes is operatively connected to the other of said pair of filter disks in a manner as to have said second plurality of ejector vanes angularly spaced thereabout.

11. A filter according to claim 10 wherein each of said ejector vanes of said first plurality of ejector vanes is positioned relative to said one of said pair of filter disks as to be situated generally radially therealong.

12. A filter according to claim 11 wherein each of said ejector vanes of said second plurality of ejector vanes is positioned relative to said other of said pair of filter disks as to be situated generally radially therealong.

13. A filter according to claim 10 wherein each of said ejector vanes of said first plurality of ejector vanes is of an effective width as to almost span the space existing between said one of said filter disks and a said material outlet shaft means adjacent thereto.

14. A filter according to claim 13 wherein each of said ejector vanes of said second plurality of ejector vanes is of an effective width as to almost span the space existing between said other of said filter disks and a said material outlet shaft means adjacent thereto.

15. A filter according to claim 1 wherein said at least one ejector vane means comprises first, second, third, fourth, fifth and sixth ejector vanes; wherein said first, second and third ejector vanes are operatively connected to one of said pair of filter disks for rotation therewith; wherein said first, second and third ejector vanes are situated as to have a position relative to said one of said pair of filter disks other than tangential to the radius of rotation about said shaft; wherein said fourth, fifth and sixth ejector vanes are operatively connected to the other of said pair of filter disks for rotation therewith; and wherein said fourth, fifth and sixth ejector vanes are situated as to have a position relative to said other of said pair of filter disks other than tangential to the radius of rotation about said shaft.

16. A filter according to claim 15 wherein each of said first, second and third ejector vanes is positioned relative to said one of said pair of filter disks as to be situated generally radially therealong.

17. A filter according to claim 16 wherein each of said fourth, fifth and sixth ejector vanes is positioned relative to said other of said pair of filter disks as to be situated generally radially therealong.

18. A filter according to claim 1 and further comprising spray nozzle means for spraying liquid against said filter disks for washing said filter disks, said nozzle means being situated as to spray said liquid against said filter disks at an area thereof which is in terms of rotation of said filter disks and ejector vane means significantly subsequent to where the said removed thickened suspension material is deposited into said material outlet shaft means.

* * * * *